Patented Apr. 20, 1937

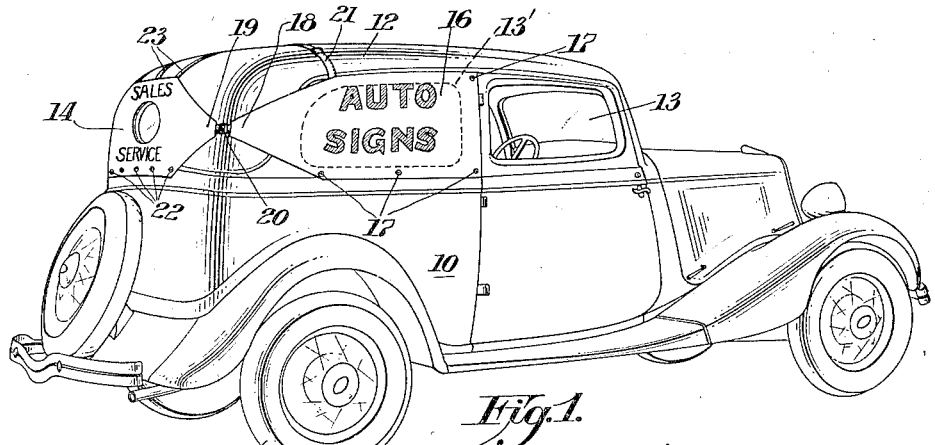
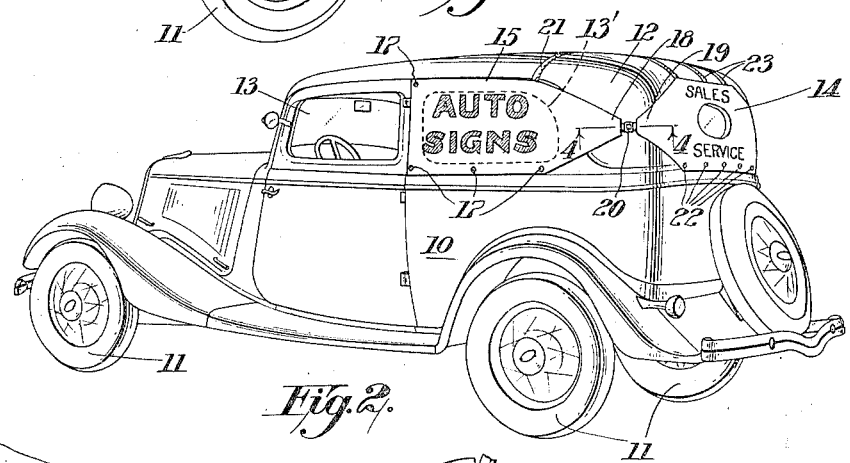
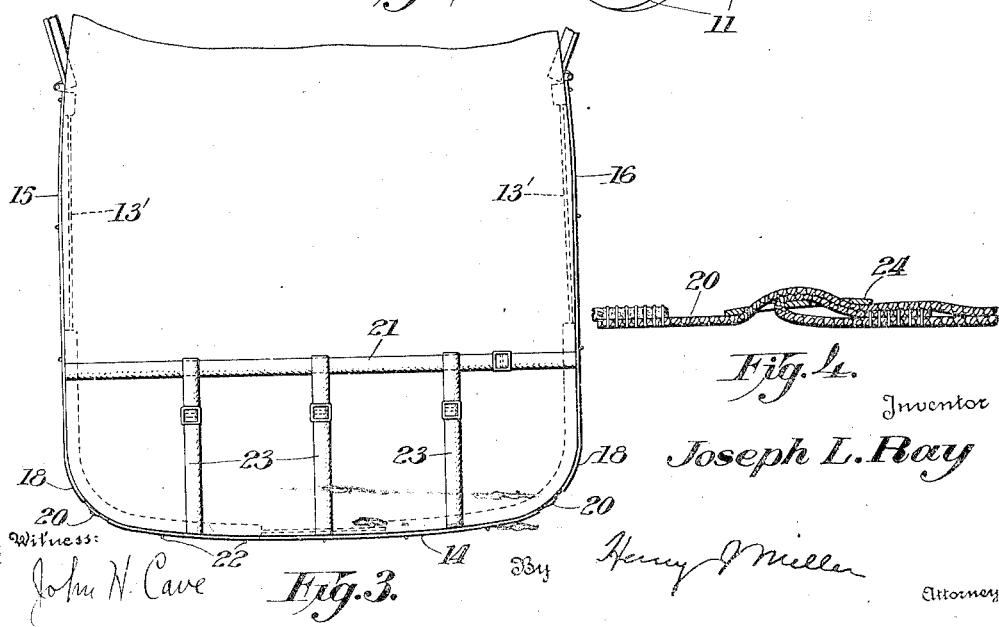

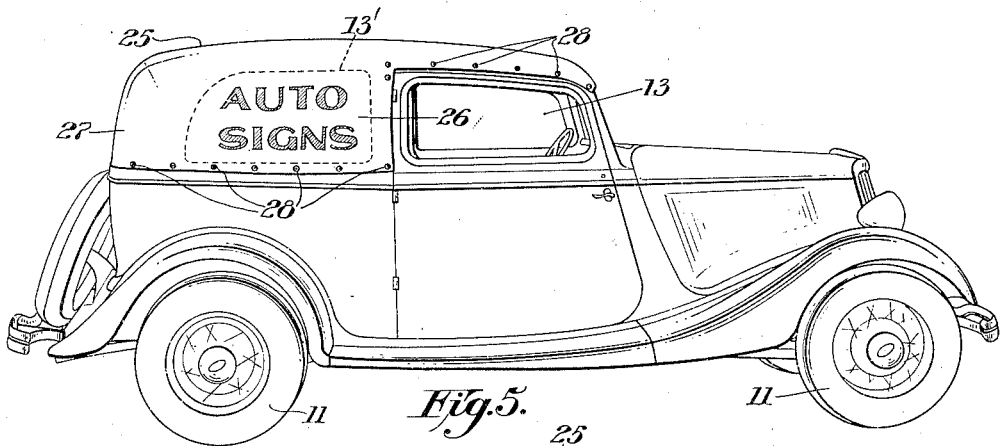
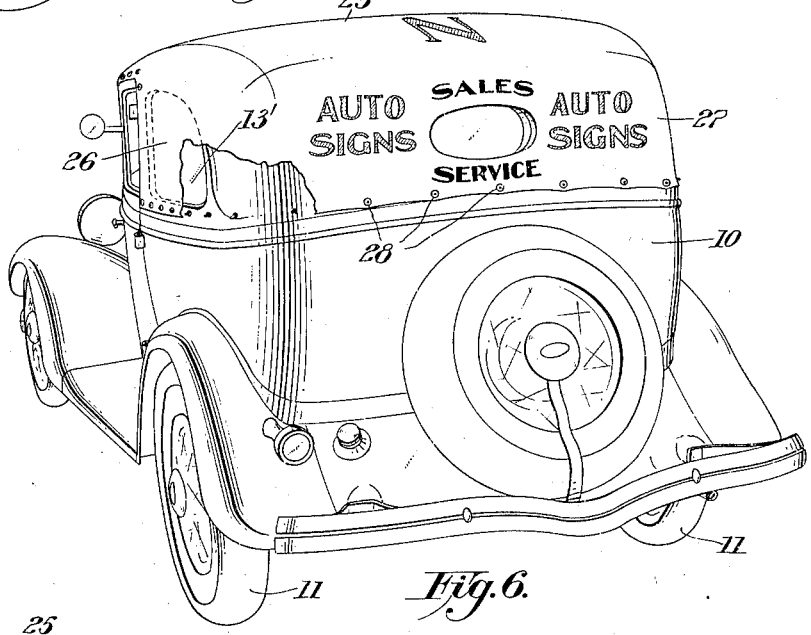
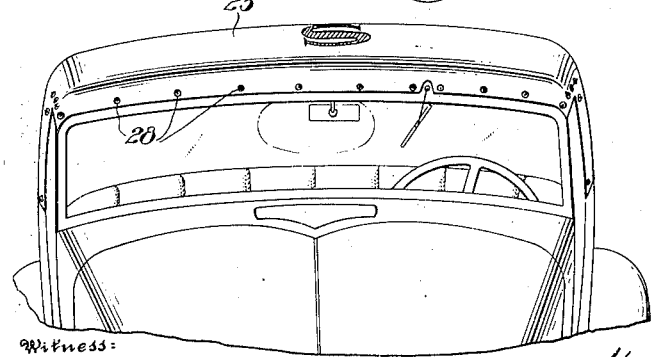

2,078,183

UNITED STATES PATENT OFFICE 2,078,183

SIGN

Joseph L. Ray, New York, N. Y., assignor to The Singer Manufacturing Company, Elizabeth, N. J., a corporation of New Jersey Application July 30, 1935, Serial No. 33,817

4 Claims. (Cl. 40—129)

This invention relates to an advertising device and more particularly to such a device in the form of a sign adapted to be detachably secured on the sides and back of an automobile top of the closed-car type.

A large number of salesmen and service-men use their personal pleasure automobiles for the purpose of calling on prospective customers or customers who have requested service. These salesmen and service-men often desire to change the appearance of the automobiles they use for pleasure to simulate the commercial type cars so as to advertise, during business hours, the products they are selling and the name of the dealer they represent.

It is an object of the invention, therefore, to provide an advertising device which can be easily and quickly attached to and detached from the sides and back of an automobile top so that it may be removed when the owner of the automobile desires to use it for pleasure riding in the evening, Sundays and holidays, and to provide an advertising device which will change the character of the automobile when it is used for commercial purposes.

Other and more specific objects of the present invention will be clearly understood from the following description and accompanying drawings in which:

Figures 1 and 2 are perspective views of an automobile having my improved advertising device carried thereby.

Figure 3 is a fragmentary top plan view of the top of the automobile showing the arrangement of the straps.

Figure 4 is a sectional view taken along the line 4—4 of Figure 2.

Figures 5 and 6 are perspective views of an automobile showing a modification of my improved advertising device.

Figure 7 is a fragmentary front elevation of an automobile illustrating the modification shown in Figures 5 and 6.

In Figures 1 and 2 there is shown a representation of a standard automobile, of the coach type, which comprises a body portion 10, wheels 11 and a top portion 12 having front-side windows 13 and rear-side windows 13'. The advertising device of the present invention comprises a back member 14 and side members 15 and 16 which are adapted to have advertising matter thereon. These members are preferably made of fibrous material such as canvas or the like and it is desirable, but not necessary, that they be made of a material which may be laundered so that they may be easily cleaned in order that the lettering and the back-ground on which the lettering is placed will present a striking contrast to each other and to the top and body of the automobile. The side members 15 and 16 completely cover and conceal the rear windows 13' and have their front and lower edges secured to the body of the car by means of the snap-fasteners 17. The rearwardly extending end-portions 18 of each of the side members are tapered and each side end-portion 19 of the back member is tapered. The tapered portions 18 of each of the side-members and the tapered side end-portions 19 of the back member are secured together in end to end relation by the straps 20 which are of less width than the back and side members. As the contour of the top differs in different makes of automobiles this construction permits the side and back members to adapt themselves to the various contours. The top edges of the side members 15 and 16 are connected to each other by means of an adjustable strap 21 which extends across the top of the automobile. The back member 14 has its lower edge secured to the body portion of the automobile by the snap-fasteners 22 and attached to its upper edge are the adjustable straps 23 which extend over the top of the car and extend around the strap 21. These adjustable straps may be made of elastic material or they may be made of flexible material with a slip buckle similar to the buckle shown at 24 in Figure 4.

From the foregoing it will be obvious that my improved advertising device may be adjusted to fit any make or size of automobile of the closed type. The straps may be adjusted to keep the sign taut to prevent it from flapping when the automobile is travelling at speed. Shrinkage and expansion of the material from which the back and side members are made due to wetting of these members by rain or laundering of the device may be compensated for. It will also be observed that the device is inexpensive to manufacture, can be easily and quickly attached to or detached from the automobile, and can be quickly adjusted to its correct position. Further, only two edges of the side members 15 and 16 are secured to the automobile and the opposite edges may be pulled taut by the adjustable straps. This construction permits the straps to be adjusted so as to eliminate wrinkles or waves in the sign, thereby enhancing its appearance. This feature is still more pronounced as regards the back member 14 in that only its lower edge is secured to the body portion of the automobile.

In Figures 5, 6, and 7 I have shown a modification of my improved advertising device. As shown, it comprises a top 25 having depending side members 26 which cover the rear windows 13' and a depending back member 27. The top, sides and back members are preferably made of flexible fibrous material and are adapted to carry advertising matter thereon. This device fits snugly over the top and sides of the top and is detachably secured thereto by the snap-fasteners 28. This type of device may be readily placed on an automobile of the sedan type thereby changing its appearance to simulate an automobile of the commercial type. This device also fully protects the top and sides from the elements.

It will be apparent that when either of the above described advertising devices are used, the inside portion of the car in rear of the front seats may be used to carry samples, tools, and articles which are to be delivered and they will be hidden from the view of pedestrians and prospective customers thereby enhancing the general appearance of the loaded automobile.

Having thus set forth the nature of the invention, what I claim herein is:—

1. The combination with an automotive vehicle of the pleasure type having a body including a top and front-side and rear-side windows, of an advertising device for changing the character of said vehicle to one of the commercial type comprising, back and side members made of flexible material and having advertising matter thereon, said side members extending over and covering and concealing the rear-side windows on each side of the vehicle, adjustable straps connecting said side members to the back member, an adjustable strap extending over the top of the automobile and connecting said side members to each other, and means for detachably securing said members to said vehicle.

2. An advertising device for an automotive vehicle having a body including a top with front-side and rear-side windows comprising, side members made of flexible material and adapted to fit over and conceal said rear-side windows, means for detachably securing the lower edges of said side members to said vehicle, an adjustable strap adapted to extend over the top of the vehicle and having its ends secured to the upper edges of said side members, a back member, adjustable straps connecting said side members to said back member, means for detachably securing the lower edge of said back-member to the vehicle and means for adjustably securing the top edge of said back-member to the first mentioned strap.

3. An advertising device for an automotive vehicle having a body including a top with front-side and rear-side windows comprising a pair of side-members made of flexible material and adapted to extend over and conceal said rear-side windows and having their front edges and lower edges detachably secured to said vehicle, a strap adapted to extend over the top of the vehicle and connect the upper edges of the side members to each other, a back-member having parallel upper and lower edges and having tapered side end-portions, straps connecting both of said side members with the ends of the tapered portions of said back member, means for detachably securing the lower edge of said back member to said vehicle and straps connecting the upper edge of said back member to said first mentioned strap.

4. An advertising device for automotive vehicles comprising a pair of side members each having a tapered portion, a strap connecting one of the edges of one of said side members with one of the edges of the other of said side members, a back member formed with two tapered portions, means connecting the ends of the tapered portions of said side members with the ends of the tapered portions of said back member, straps connecting one of the edges of said back member to the strap connecting the edges of said side members and means for detachably securing said side and back members to the vehicle.

JOSEPH L. RAY.